United States Patent
Ahmad et al.

(10) Patent No.: US 10,157,089 B2
(45) Date of Patent: Dec. 18, 2018

(54) EVENT QUEUE MANAGEMENT FOR EMBEDDED SYSTEMS

(71) Applicant: Mentor Graphics Corporation, Wilsonville, OR (US)

(72) Inventors: Irfan Ahmad, Lahore (PK); Raheel Qutab, Lahore (PK)

(73) Assignee: MENTOR GRAPHICS CORPORATION, Wilsonville, OR (US)

( * ) Notice: Subject to any disclaimer, the term of this patent is extended or adjusted under 35 U.S.C. 154(b) by 120 days.

(21) Appl. No.: 15/433,912

(22) Filed: Feb. 15, 2017

(65) Prior Publication Data

US 2017/0262324 A1    Sep. 14, 2017

Related U.S. Application Data

(63) Continuation of application No. 13/747,427, filed on Jan. 22, 2013.

(60) Provisional application No. 61/632,411, filed on Jan. 20, 2012.

(51) Int. Cl.
*G06F 9/54* (2006.01)

(52) U.S. Cl.
CPC .............. *G06F 9/546* (2013.01); *G06F 9/542* (2013.01); *G06F 2209/548* (2013.01)

(58) Field of Classification Search
CPC ..... G06F 9/546; G06F 9/542; G06F 2209/548
See application file for complete search history.

(56) References Cited

U.S. PATENT DOCUMENTS

| | | | |
|---|---|---|---|
| 5,953,746 A | 9/1999 | Crocker et al. | |
| 6,145,061 A | 11/2000 | Garcia et al. | |
| 7,380,248 B1 | 5/2008 | Isenberg et al. | |
| 8,452,901 B1 | 5/2013 | Sandstrom et al. | |
| 2001/0002480 A1 | 5/2001 | Dekoning et al. | |
| 2002/0026502 A1 | 2/2002 | Phillips et al. | |
| 2004/0153998 A1* | 8/2004 | McGuire | G06F 9/542 717/128 |
| 2004/0205773 A1* | 10/2004 | Carcido | G06F 9/542 719/318 |
| 2008/0228967 A1 | 9/2008 | Krig | |
| 2009/0182610 A1 | 7/2009 | Palanisamy et al. | |
| 2011/0258639 A1 | 10/2011 | Walsky et al. | |
| 2011/0285731 A1 | 11/2011 | Andre et al. | |
| 2012/0117223 A1* | 5/2012 | Jennings | G06F 9/542 709/224 |

(Continued)

*Primary Examiner* — Charles E Anya

(57) ABSTRACT

An event management structure for an embedded system, which supports multiple waiters waiting on the same event without replicating the events for each waiter, is provided. Notifications of events are received from entities within an embedded system. The event management architecture then posts the events to a central queue and generates a unique identification tag for each posted event. Additionally, entities within the embedded system are allowed to wait on specific events. More specifically, entities may request access to specific events based on the unique identification tag associated with a particular event. In further implementations, data associated with queued events may be provided to the waiters. In some implementations, events matching a specific description since a particular event, identified by its unique identification tag, may be requested by entities in the embedded system.

15 Claims, 5 Drawing Sheets

(56) References Cited

U.S. PATENT DOCUMENTS

2012/0151487 A1 6/2012 Frank et al.
2013/0042001 A1* 2/2013 Gould .................. G06F 9/542
                                                                709/224

* cited by examiner

EVENT QUEUE MANAGEMENT FOR EMBEDDED SYSTEMS

RELATED APPLICATIONS

This application is a continuation of U.S. patent application Ser. No. 13/747,427 entitled "Event Queue Management For Embedded Systems," filed on Jan. 22, 2013, and naming Irfan Ahmad, Sadiq Muhammad, and Raheel Qutab, which claims priority under 35 U.S.C. § 119 to U.S. Provisional Patent Application No. 61/632,411 entitled "Event Queue Management For Embedded Systems," filed on Jan. 20, 2012, and naming Irfan Ahmad as inventor, both of which applications are incorporated entirely herein by reference.

FIELD OF THE INVENTION

The present invention is directed towards the management and queuing of events. The invention may be particularly useful within an embedded system.

BACKGROUND OF THE INVENTION

An embedded system may be described as a special purpose computing system designed to perform one or a few dedicated functions. Embedded systems are commonly used in consumer devices like personal digital assistants, mobile phones, videogame consoles, microwaves, washing machines, alarm systems, and digital cameras. In addition to the consumer space, embedded systems are used in nearly every industry, from telecommunications to manufacturing, and from transportation to medical devices. In fact, embedded systems are in use so commonly today that it is not feasible to exhaustively list every example.

The term "embedded system" does not have a precise definition. For example, a general purpose computer, such as a laptop, is not typically characterized as an embedded system. However, a laptop is usually composed of a multitude of subsystems such as the hard disk drive, the motherboard, the optical drive, the video processing unit, and various communication devices. Many of the individual subsystems comprising the laptop may themselves be embedded systems.

The complexity of embedded systems can vary. For example, a simple system may have a single microcontroller chip and a light emitting diode, while a more complex system may have multiple microprocessor units and various peripheral communication interfaces and mechanical parts. Manufacturers of modern microprocessors are increasingly adding components and peripheral modules to their microprocessors, and creating what may be thought of as embedded processors. This type of embedded system is often referred to as a system on a chip (SoC). A simple example of an SOC is an application-specific integrated circuit (ASIC) packaged with a universal serial bus (USB) port. Additionally, embedded systems range from those having no user interface at all to those with full user interfaces similar to a desktop operating system.

There are many advantages to using embedded systems. An embedded system is designed typically to do some specific task, as opposed to being a general purpose computer with a wide range of features for performing many different tasks. As a result, design engineers can optimize the embedded system for the desired task, which assists in reducing the size and cost of the device as well as increasing its reliability and performance.

The software that operates an embedded system is generally referred to as "firmware." Firmware is often stored on read only memory ("ROM") based storage devices. For example, flash-based read only memory or electronically erasable read only memory ("EEPROM") devices are often used to store firmware. The firmware is used to control the various features, functioning, and interfaces of the embedded system. Thus, a digital video disk player will have firmware that processes the appropriate response to an input, such as the user pressing the "power" button or the "play" button. Additionally, the firmware in this example would control the storage mechanism, the digital processing circuitry used to decode and output onto the appropriate ports, the video and audio signals stored on the video storage medium, as well as the user interface allowing the user to configure settings of the digital video disk player.

Many embedded systems and software executable on these embedded systems are event-driven. More specifically, events such as changes in the state of the embedded system are used to trigger subsequent responses of the system. As can be appreciated by those of ordinary skill in the art, event-driven systems require a means for keeping track of events and for allowing various components of the system to "wait" for a particular event. Where multiple components or "waiters" are waiting on the same event, it is possible that one or more of the waiters can miss the event if they are busy when the event is identified and processed by the system.

A common solution to this problem is to provide a separate queue for each waiter. Subsequently, any event that the waiter is interested in is added to its local queue. Accordingly, events with more than one waiter are replicated across multiple queues. As can be appreciated, the overhead requirements for this type of system increase proportionally to the number of waiters in the system. Furthermore, the efficiency and reaction time of the waiters in these types of systems decreases proportionally to the number of waiters in the system.

BRIEF SUMMARY OF THE INVENTION

Various implementations of the present invention provide event management architectures capable of supporting multiple waiters without replicating events in the presence of multiple waiters.

In various implementations, an event management structure, such as, for example, within an embedded system, is provided. The event management structure receives notification of events from entities within an embedded system. The event management architecture then posts the events to a central queue and generates a unique identification tag for each posted event. Additionally, entities within the embedded system (i.e. waiters) are allowed to wait on specific events. More specifically, waiters may request access to specific types of events based on the unique identification tag associated with a particular event. In further implementations, data associated with queued events may be provided to the waiters. In some implementations, waiters may request access to specific types of events based on a description of the event.

With some implementations, an events unique identification tag may be used to describe the requested event. In further implementations, where the particularly identified event is no longer in the queue, an error may be generated and the entire queue may be searched for events matching the description. With various implementations, an event queue size manager may be provided, which, under certain circumstances may dynamically change the size of the event queue.

These and additional implementations of the invention will be further understood from the following detailed disclosure of illustrative embodiments.

BRIEF DESCRIPTION OF THE DRAWINGS

The present invention will be described by way of illustrative implementations shown in the accompanying drawings in which like references denote similar elements, and in which.

DETAILED DESCRIPTION OF THE INVENTION

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms such as "generate" to describe the disclosed implementations. Such terms are often high-level abstractions of the actual operations that are performed. The actual operations that correspond to these terms will often vary depending on the particular implementation.

Furthermore, in various implementations, a mathematical model may be employed to represent an electronic device. For example, a model describing the connectivity of the device, such as a netlist, might be employed. Those of ordinary skill in the art will appreciate that the models, even mathematical models, represent real world physical device designs and real world physical phenomenon corresponding to the operation of the device. Additionally, those of ordinary skill in the art will appreciate that during many electronic design and verification processes, the response of a device design to various signals or inputs is simulated. This simulated response corresponds to the actual physical response the device being modeled would have to these various signals or inputs.

Some of the methods described herein can be implemented by software stored on a computer readable storage medium, or executed on a computer. Accordingly, some of the disclosed methods may be implemented as part of a computer implemented electronic design automation ("EDA") tool. The selected methods could be executed on a single computer or a computer networked with another computer or computers.

Illustrative Computing Environment and Embedded System

Figure 1:
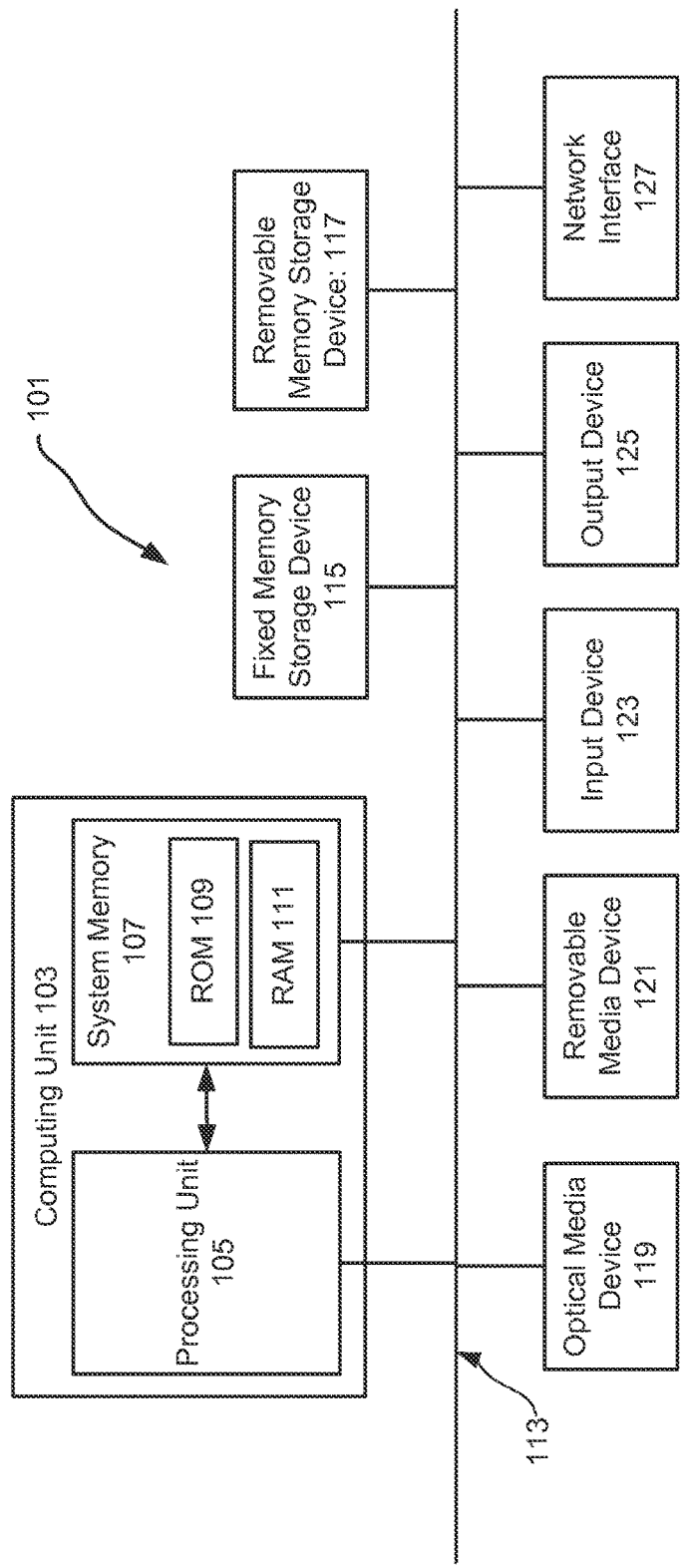
FIG. 1 shows a computing device 101 that may be used to facilitate various implementations of the present invention.

As the techniques of the present invention may be implemented using software instructions, the components and operation of a general purpose computer system with which various implementations of the invention may be employed are described. Accordingly, FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be a microprocessor. The system memory 107 may include both a read-only memory ("ROM") 109 and a random access memory ("RAM") 111. As will be appreciated by those of ordinary skill in the art, both the ROM 109 and the RAM 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as: A fixed memory storage device 115, for example, a magnetic disk drive; a removable memory storage device 117, for example, a removable solid state disk drive; an optical media device 119, for example, a digital video disk drive; or a removable media device 121, for example, a removable floppy drive. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus ("USB") connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol ("TCP") and the Internet protocol ("IP"). Also, the interface 127 may employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
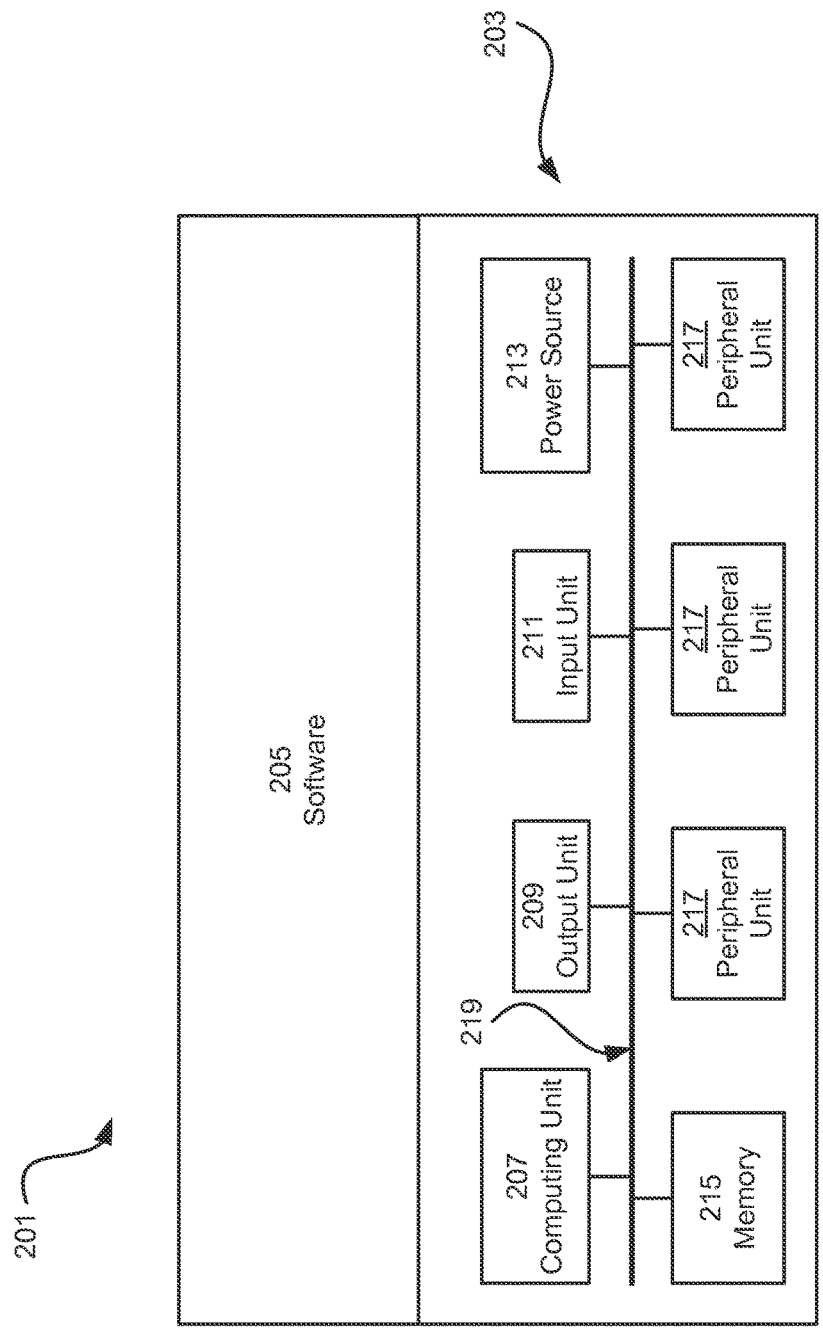
FIG. 2 shows an embedded system.

As stated above, various implementations of the present invention are applicable to event management in an embedded system. As such, an illustrative embedded system is described in conjunction with FIG. 2, which shows an embedded system 201. As can be seen from this figure, the embedded system 201 includes both hardware 203 and software 205. As illustrated, the hardware 203 includes a computing unit 207, an output unit 209, an input unit 211, a power source 213, a memory 215 and a number of peripheral units 217. Those of skill in the art will appreciate that not all embedded systems include the features illustrated in FIG. 2. Furthermore, additional features, not illustrated in FIG. 2, may be present in an embedded system. For example, as stated above, an embedded system may be configured as a cell phone. Accordingly, peripheral units 217 configured for cellular communication would be included in the embedded system 201. As can be further seen from this figure, the various components of the embedded system are interconnected via a bus 219.

The software 205, which may also be referred to as the "firmware" or the "operating system" (OS), is typically stored on a non-transient memory component. More particularly, the software 205 may be stored on the memory 215. In this manner, the functionality "programmed" into the software 205 may be accessed and used to interact with and control the hardware 203 of the embedded system 201.

Those of ordinary skill in the art will appreciate that many embedded systems, such as, for example, the embedded system 201, share some of the same componentry and operation to a general purpose computer, such as, for example, the computing system 101 of FIG. 1. Furthermore, embedded systems are often connectable to or even operated in conjunction with a general purpose computer. For this reason, a distinction between a general purpose computer and an embedded system is not made in the balance of this disclosure.

Event Management Queue

As stated above, various implementations of the invention provide an "event" queue management architecture that enables a single event queue to support all "waiters" in the system. As used herein, an "event" may be any change in state within the system. For example, a change in state of the power source 213 from 100% charged to 90% charged may be considered an event. Another example of an event may be the software 205 changing state. Typically, an entity within the system, that is, any component of the system or any software, or sub-portion thereof, executing on the system may notify the system of an event. Often this is referred to as "posting" an event. In alternative implementations, event posting may be restricted to certain entities. As just detailed, and as those of skill in the art will appreciate, any number of different occurrences within an embedded system may be considered events. As such, an exhaustive list is not produced herein.

A "waiter" may be any component within the system, such as, for example, the output unit 209 or a one of the peripheral units 217 may be a waiter. In some implementations, components of the software 205 may also be waiters. Typically, any entity may be a waiter. As those of ordinary skill in the art will appreciate, various different types and classes of components or "entities" may be found within a system. Various implementations of the invention do not have restrictions of which of these entities can be waiters. In alternative implementations, only certain entities are allowed to be waiters. Alternatively still, as will be further described below, in some instances multiple queues may be established wherein event posting and waiting privileges in the system may be restricted based upon the event queue.

Figure 3:
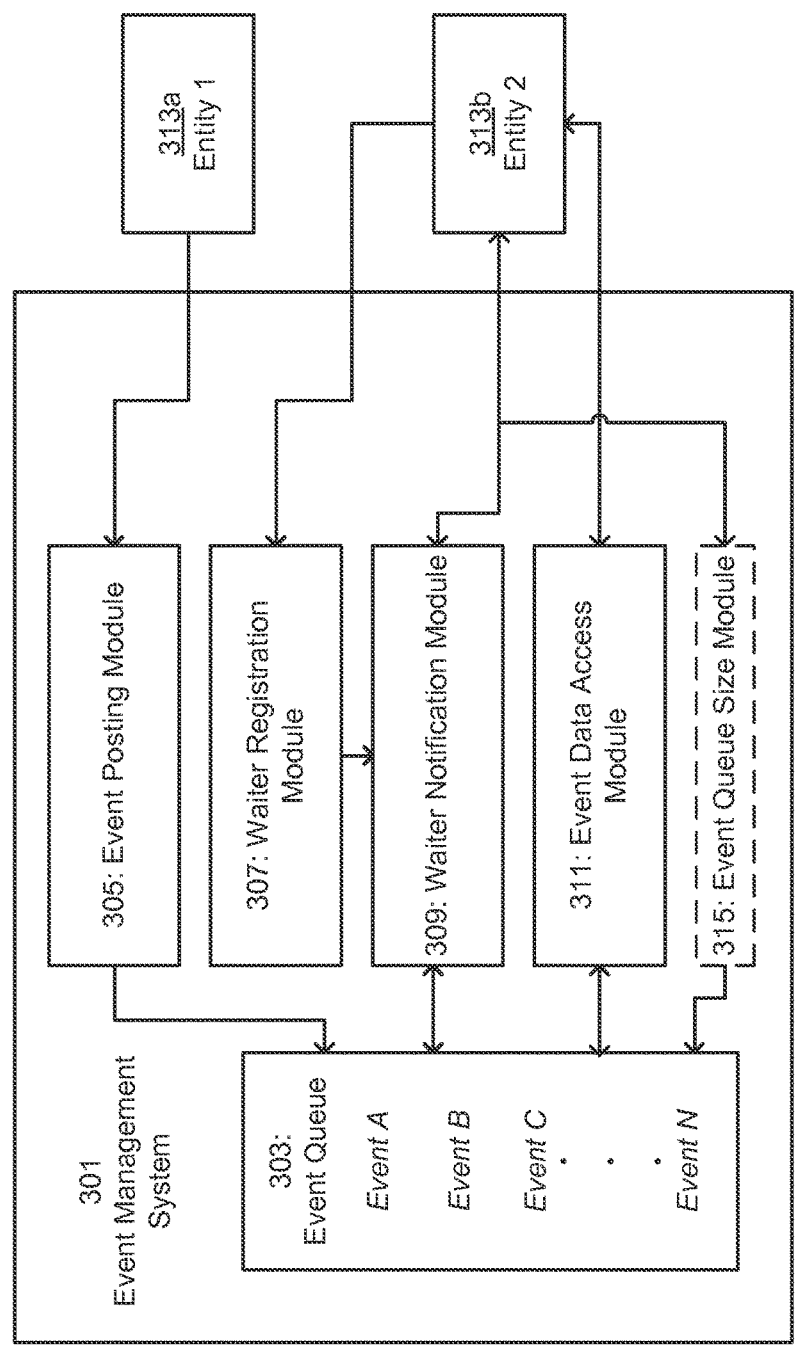
FIG. 3 shows an event queue management system having a single queue.
Figure 4:
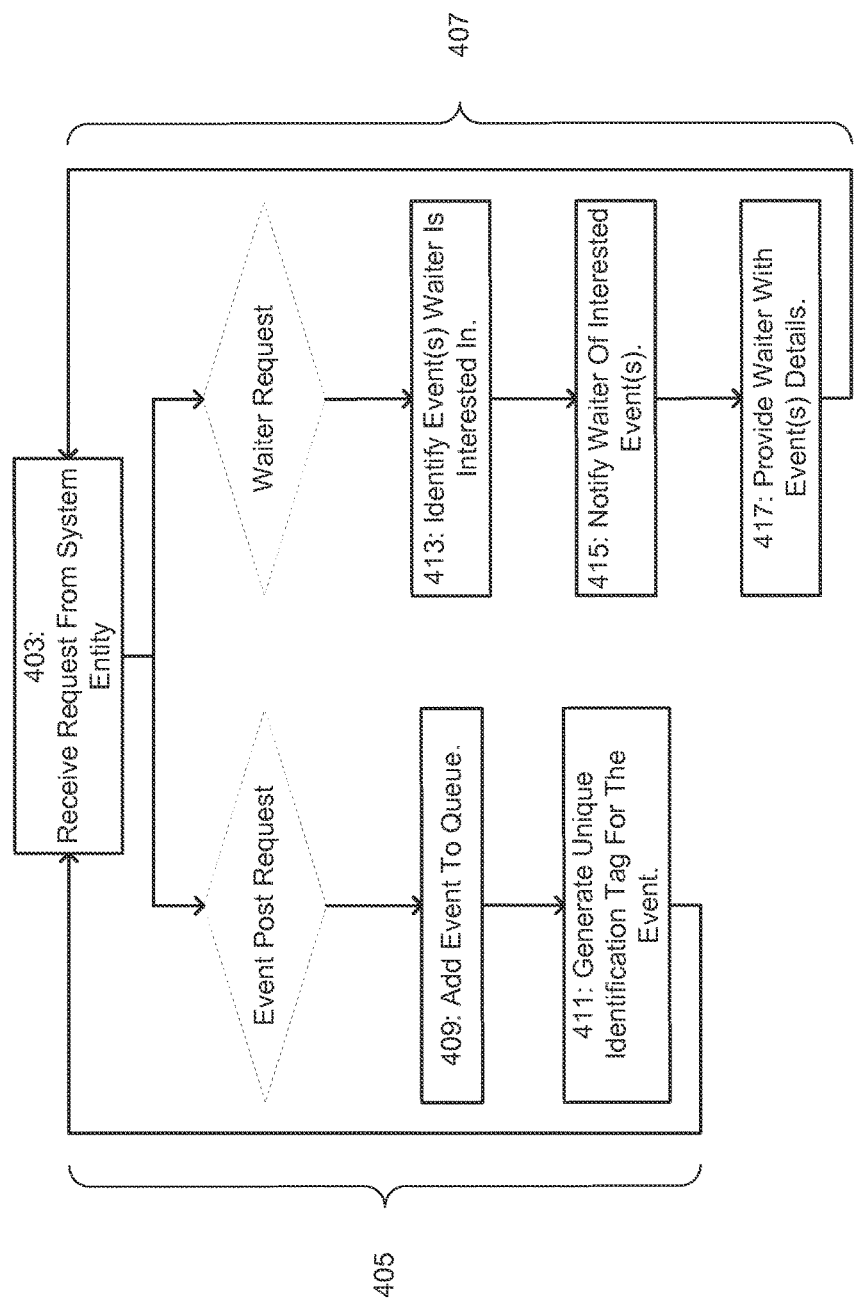
FIG. 4 shows a method of managing an event queue in an embedded system.

FIG. 3 illustrates a system 301 that may be provided by various implementations of the present invention. FIG. 4 illustrates a method of event queue management 401 that may be provided by some implementations of the present invention. With some implementations, the system 301 and the method 401 may be used in conjunction with each other to provide an event queue and management architecture according to various embodiments of the present invention. Alternatively, the system 301 or the method 401 may be used separately to provide event queue management architectures or processes according to various implementations of the present invention. Reference to both FIGS. 3 and 4 will be made herein in discussing various illustrative implementations.

As can be seen from FIG. 3, the system 301 includes an event queue 303. In some implementations of the invention, the event queue 303 is a circular buffer. With further implementations, the size of the event queue 303, more specifically, the size of the data structure forming the circular buffer, is static. With alternative implementations, which will be described in more detail below, the size of the event queue 303 is dynamic and may be adjusted during operation of the system 301.

The system 301 additionally includes an event posting module 305, a waiter registration module 307, a waiter notification module 307, a notification module 309 and an event data access module 311. In various implementations, these modules may be implanted by a computer readable medium having software instructions stored thereon, computer-executable instructions executing on a programmable computer, or some combination of the two. FIG. 3 also shows an event queue size module, in some implementations, may be included in the system 301. Furthermore, FIG. 3 shows entities 313a and 313b being in communication with the system 301.

Turning to FIG. 4, the method 401 includes an operation 403 for receiving a request from an entity within or otherwise associated with the system. Subsequently, as can be seen, there are two tracks based on the type of request received by the operation 403. More specifically, if the request received by the operation 403 is a request to post an event, then track 405 is followed. Alternatively, if the request received by the operation 403 is a request from a waiter, then track 407 is followed. The event posting track 405 includes an operation 409 for adding the event to an event queue and an operation 411 for generating a unique identification tag for the event. Conversely, the waiter request track 407 includes an operation 413 for identifying an event or events in which the waiter is interested, an operation 415 for notifying the waiter of the identified events, and an operation 417 for providing the waiter with event details, such as, for example, data associated with the event or events identified.

Event Posting

With various implementations, the operation 403 for receiving a request from an entity receives a request to post an event. As indicated above, in some implementations any entity may post an event. As can be seen from FIG. 3, the entity 313a (i.e. Entity 1) is shown contacting the event posting module 305 to request that an event be posted. The event posting module 305 may then add the event to the event queue 303 as detailed by the operation 409. Furthermore, a unique identification tag is generated for the posted event according to the operation 411. Techniques for generating unique identification numbers, such as, for example, the Globally Unique Identifier (GUID) system or the Universally Unique Identifier (UUID) system, are known to those of skill in the art, and, as such, they are not described herein.

In various implementations, the request to post an event includes a description of the event, such as, for example, a listing of the event type, or other information about the event that may be selected when the system is configured. The operation 409 then causes the event along with the unique identification tag to be included into the event queue 303. In some implementations, the event description is also stored in the event queue 303. As can be seen from FIG. 3, the event queue 303 includes a number of events, specifically, Event A through Event N. Additionally, in some implementations, the event also includes associated data, such as data associated with the event, or a memory addresses where data associated with the event is stored. In some cases, the associated data is also added to the event queue 303. In alternative implementations, the associated data is stored outside the event queue 303, such as, for example, onto one or more non-transient memory storage media, devices, or locations. Accordingly, a link to the memory storage location would be stored in the event queue 303.

Wait Registration

FIG. 3 also shows the entity 313b (i.e. Entity 2) contacting the wait registration module 309. As stated, with some implementations, the operation 403 for receiving a request from an entity receives a request from an entity to register as a waiter. More specifically, an entity within the system may request to receive information about an event. In various implementations, an entity may request to wait on more than one event. Additionally, multiple waiters may wait on the same event. As stated above, events are stored in the event queue 303 with an event type and a unique identification tag. In some cases, waiters may request to receive information about certain events, typically identified by the event type, from the point of request on. Alternatively, waiters may request to receive information about certain events from a particular event (identified by the events unique identification tag) on. Alternatively still, waiters may request to receive information about certain events starting from the oldest event in the event queue 303 on. More specifically, the entire event queue 303 would be searched for the specified event or events.

As those of ordinary skill in the art will appreciate, queues often store items based on when the items were added to the queue. Accordingly, as indicated above, the event queue 303 may be searched, by for example, the event data access module 311, based on the order events were added to the event queue 303. More specifically, events added to the event queue 303 after a specified event was added may be searched. Those of ordinary skill in the art will appreciate that alternative methods of managing queue's may also be used. Various implementations of the invention may be adapted to accommodate such queues without departing from the spirit and scope of the invention.

Subsequent to a request being received from a waiter, the operation 413 operates to identify the event or events specified by the waiter. As stated above, the event management system includes the waiter registration module 307 and the notification module 309. In various implementations, an entity, such as for example, the entity 313b, contacts the wait registration module 307 with a request to wait on a specified event. The wait registration module then passes the request to the notification module 309, which identifies the specified event from the event queue 303. In various states of operation, the specified event will not yet be in the event queue 303. In which case, the notification module 309 will hold the request until the specified event is identified in the event queue 303. The event queue 303 may then periodically be searched, or new events may be checked as they are added to the event queue 303, in order to find events that match the request. Once the specified event is identified, the waiter is notified of the event. In some implementations, the unique identification tag associated with the identified event is provided to the requesting entity 313b (i.e. the waiter.)

The operation 417 provides for a waiter to access associated data from an event. For example, as described above, the notification module 309 notifies a waiter once the specified events are identified and provides the unique identification tag to the waiter. In some implementations the operation 415 also provides a ticket to the waiter. This ticket may then be used by the waiter to access event details as well as any data associated with the event. For example, if the associated data is stored outside of the event queue 303, then is the ticket a link to the memory location where that information is stored. Alternately, if the information is stored in the event queue 303, the ticket is permission, or some reference allowing the waiter to request the information from the event queue 303 through a follow-up request to the event data access module 311. In alternative implementations, the operations 415 and 417 may be combined into a single operation.

As indicated above, many systems, such as the system 201 are event driven. More specifically, system operations are triggered by particular events occurring within the system. Accordingly, waiters within the system may use the event information provided by the event queue management system 301 to know when to perform specific operations.

Error Recovery and Dynamic Queue Sizing

As stated above, the event management system 301 may optionally include an event queue size module 313. With some implementations, the event queue size module 313 may be used to dynamically adjust the size of the event queue 303. As detailed above, in some implementations, a request to wait on a first event may be made by specifying that the event queue 303 be searched since the occurrence of a second event, identified by the second events unique identification tag. If the wait registration module 307 determines that the second event is no longer within the event queue 303, an error may be reported to the event queue size management module 313, which may, increase the size of the event queue in response. In various implementations, the error may be used to determine if the size of the event queue 303 is too small. More specifically, if errors are continually generated, then it may be assumed that the size of the event queue 303 it is too small as evenest are purged from the vent queue prior to being available for waiters.

Multiple Queues

Figure 5:
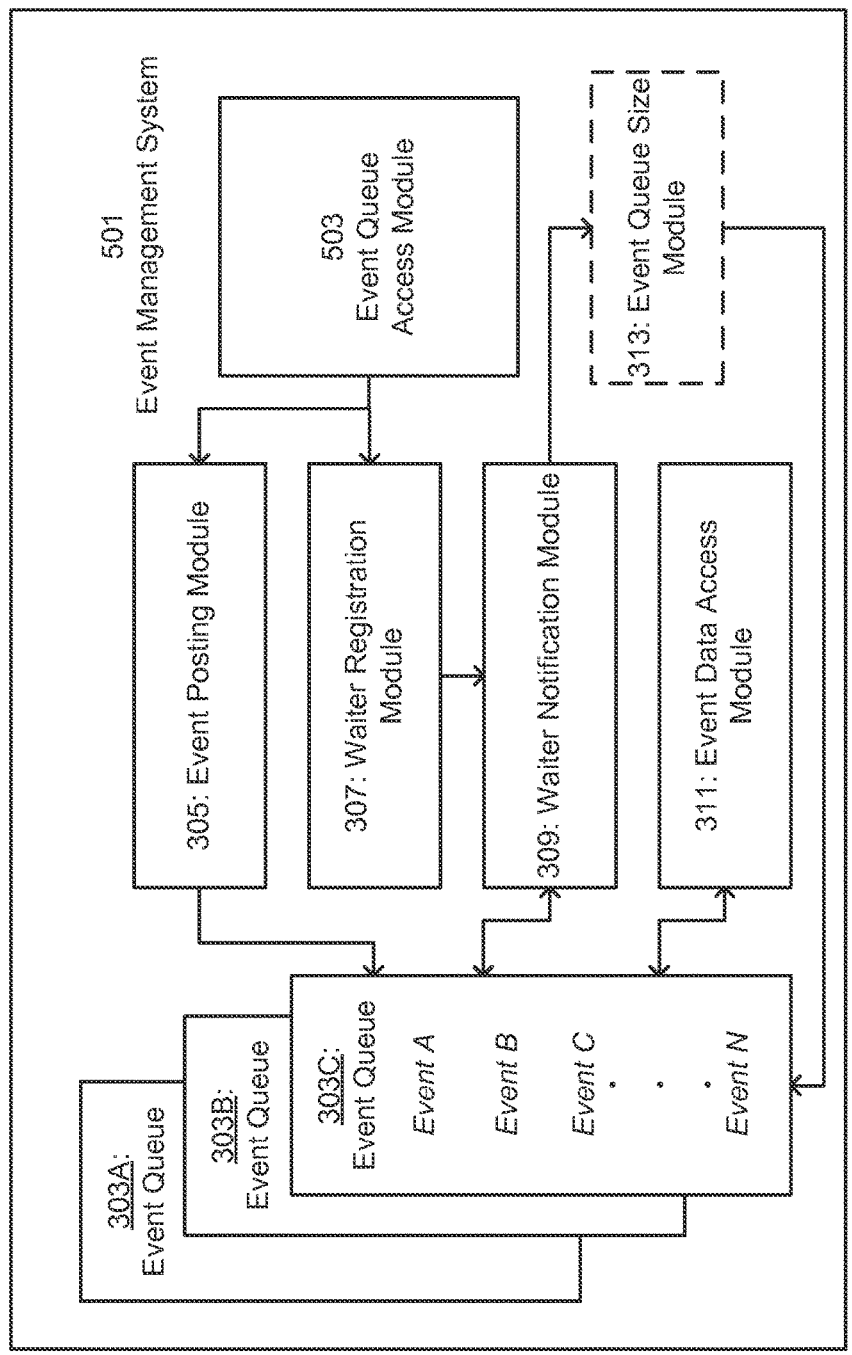
FIG. 5 shows an event queue management system having multiple queues.

As stated above, in some implementations, multiple event queues 303 may be provided. FIG. 5 illustrates the event management system 301 having multiple events queues 303 (i.e. 303A-303C). As can be seen from this figure, the event management system 501 includes the features of the event management system 301, as well as multiple event queues 303 and an event queue access module 503. With some implementations, an event queue 303 may be maintained where all entities within the system may post and wait on events. Additionally, other event queues may be maintained where only authorized entities may post events or wait on events, or some combination of both.

Where multiple event queues 303 are provided, the event queue access module 503 may authenticate the different entities when they request to post an event or request to wait on an event. If the entity is properly authorized, and authenticated by the event queue access module 503, the request will be processed as detailed above. More specifically, depending upon the type of request (i.e. event posting request or event waiting request,) the event will be posted to the requested event queue 303, or alternatively, the event queue searched, as described above.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A computer-implemented method for managing one of a plurality of event queues within a real-time operating system executable on an embedded system, the method comprising:
   receiving a request from a first entity within an embedded system to wait on an event, wherein the request identifies the event with a first unique identification tag and wherein the request specifies the queue to be searched for the event;
   determining when the first event is posted to an event queue by searching the specified event queue to determine if an event having the first identification tag is stored within the event queue; wherein
   if it is determined that the event having the first unique identification tag is not stored in the event queue, generating an error;
      reporting the error to an event queue size management module;
      increasing, by the event queue size management module, the size of the event queue if it is determined that the error occurs more than once; and
      otherwise providing details of the event matching the first unique identification tag to the first entity notifying the first entity once the event is posted; and
      providing access to data associated with the first entity to the first entity.

2. The computer-implemented method recited in claim 1, further comprising:
   receiving a request to post a second event to the event queue from a second entity within the embedded system;
   generating a unique identification tag for the second event; and
   adding the second event to at least one of the plurality of event queues.

3. The computer-implemented method recited in claim 2, further comprising adding data associated with the second event to the specified event queue.

4. The computer-implemented method recited in claim 1, wherein the request from the first entity identifies the first event by a first unique identification tag, the method act of determining when the first event is posted to the specified event queue comprising:
   searching the specified event queue to determine if an event having the first unique identification tag is stored within the specified event queue;
   again searching the specified event queue if determined that an event having the first unique identification tag is stored within the specified event queue, to determine a first event is stored within the specified event queue;
   providing details of the event matching the first unique identification tag to the first entity if it is determined that an event having the first unique identification tag is stored within the specified event queue; and
   waiting for the first event if it is determined that an event having the first event is not stored in the specified event queue; and
   generating an error if it is determined that an event having the first unique identification tag is not stored within the specified event queue.

5. The computer-implemented method recited in claim 4, further comprising modifying the size of the specified event queue.

6. One or more non-transient computer readable storage media having instructions stored thereon that cause a computer to perform a set of operations, the set of operations comprising:
   receiving a request from an entity within an embedded system to wait on an event, wherein the request specifies one of a plurality of event queues to be searched;
   determining when the event is posted to the specified event queue;
   if it is determined that the event having the first unique identification tag is not stored in the specified event queue, generating an error;
      reporting the error to an event queue size management module;
      increasing, by the event queue size management module, the size of the specified event queue if it is determined that the error occurs more than once; and
      otherwise providing details of the event matching the first unique identification tag to the first entity notifying the first entity once the event is posted; and
      providing access to data associated with the first entity to the first entity.

7. The one or more non-transient computer readable media recited in claim 6, the set of operations further comprising:
   receiving a request to post a second event to the event queue from a second entity within the embedded system;
   generating a unique identification tag for the second event; and
   adding the second event to the specified event queue.

8. The one or more non-transient computer readable media recited in claim 7, the set of operations further comprising adding data associated with the second event to the specified event queue.

9. The one or more non-transient computer readable media recited in claim 6, wherein the request from the first entity identifies the first event by a first unique identification tag, the operations for determining when the first event is posted to the specified event queue comprising:
   searching the event queue to determine if an event having the first unique identification tag is stored within the specified event queue;
   providing details of the event matching the first unique identification tag to the first entity if it is determined that an event having the first unique identification tag is stored within the specified event queue; and
   generating an error if it is determined that an event having the first unique identification tag is not stored within the specified event queue.

10. An embedded system comprising:
    a processor;

a plurality of entities;

a plurality of event queues; and a memory having a set of instructions stored thereon that cause the embedded system to perform a set of operations, the set of operations comprising:

receiving a request from a first one of the plurality of entities to wait on a first event, wherein the request specifies the queue to be searched for the event;

determining when the first event is posted to the one of the plurality of event queues;

if it is determined that the event having the first unique identification tag is not stored in the specified event queue, generating an error;

reporting the error to an event queue size management module;

increasing, by the event queue size management module, the size of the specified event queue if it is determined that the error occurs more than once; and otherwise providing details of the event matching the first unique identification tag to the first entity notifying the first entity once the event is posted; and providing access to data associated with the first entity to the first entity.

11. The one or more non-transient computer readable media recited in claim 9, the set of operations further comprising modifying the size of the specified event queue.

12. The embedded system recited in claim 10, the set of operations further comprising:

receiving a request to post a second event to the one of the plurality of event queues from a second one of the plurality of entities;

generating a unique identification tag for the second event; and adding the second event to the one of the plurality of event queues.

13. The embedded system recited in claim 12, the set of operations further comprising adding data associated with the second event to the one of the plurality of event queues.

14. The embedded system recited in claim 10, wherein the request from the first entity identifies the first event by a first unique identification tag, the operation for determining when the first event is posted to the one of the plurality of event queues comprising:

searching the one of the plurality of event queues to determine if an event having the first unique identification tag is stored within the one of the plurality of event queues;

providing details of the event matching the first unique identification tag to the first entity if it is determined that an event having the first unique identification tag is stored within the one of the plurality of event queues; and generating an error if it is determined that an event having the first unique identification tag is not stored within the one of the plurality of event queues.

15. The embedded system recited in claim 14, the set of operations further comprising modifying the size of the one of the plurality of event queues.

\* \* \* \* \*